May 5, 1953  R. D. McINTOSH  2,637,227
TUBE WORKING TOOL
Filed Sept. 9, 1949
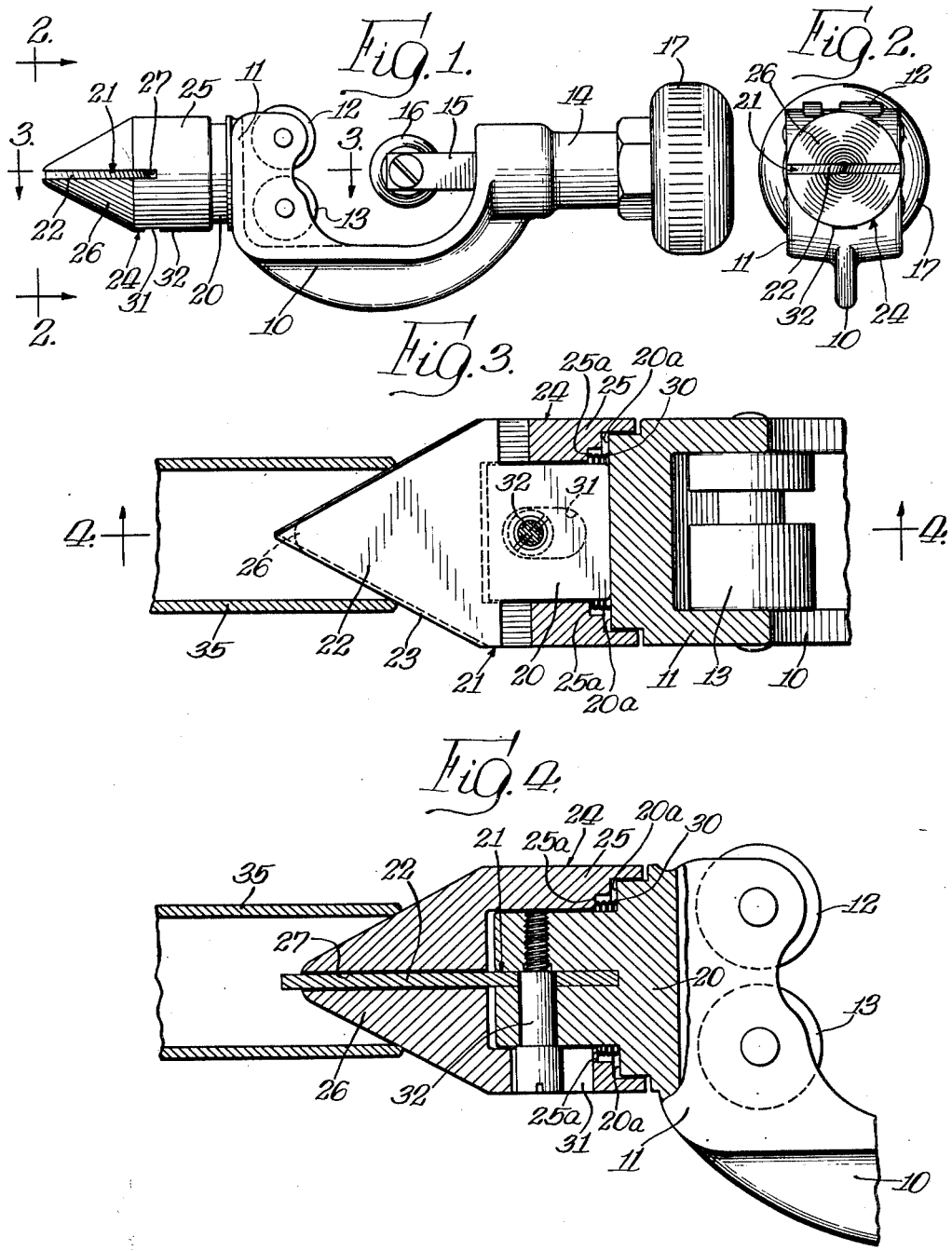
INVENTOR.
Robert D. McIntosh Patented May 5, 1953

2,637,227

UNITED STATES PATENT OFFICE 2,637,227

TUBE WORKING TOOL

Robert D. McIntosh, River Forest, Ill., assignor to The Imperial Brass Manufacturing Company, a corporation of Illinois Application September 9, 1949, Serial No. 114,710

2 Claims. (Cl. 77—73.5)

This invention relates to a tube working tool and more particularly to a hand-operated tool for reaming relatively small tubes.

The general object of the invention is to provide an improved tube working tool.

Another object of the invention is to provide a tube working tool with a body member having a reamer fixedly mounted thereon and a sheath member slidably mounted thereon for movement between a first terminal position wherein the reamer is housed within the sheath member and a second terminal position wherein a portion of the reamer projects out of the sheath member.

Another object is to provide a tool of this character having means for limiting the sliding movement of the sheath member and spring means for yieldably biasing the shath member to the first terminal position defined above.

Another object is to provide a tool of this character wherein the reamer has a pointed V-shaped blade, the sides of which form cutting edges, and the sheath member has a tube-engaging end with conical walls and a slot extending from the apex and opening into said walls on opposite sides throughout the entire length of the conical portion thereof, said slot containing the reamer.

Another object is to provide a tool of this character wherein the sides of the reamer blade are beveled to form leading cutting edges which project out of the slot in the sheath member throughout the entire length of the conical portion of the sheath member when the sheath member is in its second terminal position.

Other objects and advantages of the invention will be apparent from the following specification and drawings, in which:

Fig. 1 is a side elevational view of a tube working tool embodying the features of this invention.

Fig. 2 is an end elevational view looking from the left of Fig. 1.

Fig. 3 is an enlarged fragmentary horizontal section along the line 3—3 of Fig. 1, showing the reamer in operation reaming a tube.

Fig. 4 is a horizontal section along the line 4—4 of Fig. 3.

Tube cutting tools of the type illustrated in Fig. 1 are commonly used for cutting relatively small tubing of copper, aluminum, steel and the like, and generally the use of such tools results in small burrs or even flanges in the bore of the tube. It is necessary for the workman to clear the flange or burrs from the tube with a reamer after the cutting operation. While a separate reamer tool may be carried by the workman in his tool box or his pocket, it is much more convenient to incorporate the reamer with the cutting tool. However, the reamer blade should normally be in an out of the way position when the reamer is not in use, for protection of the workman who handles the tool and for protection of the blade; and this is true whether the reamer is incorporated in a tube cutter or whether the reamer comprises a separate tool.

Referring now more particularly to the drawings, in Fig. 1 the novel structure is shown as being incorporated in a tube cutting tool, although it will be understood that such a tool is not necessary to the invention, but merely illustrates a preferred form. The tool comprises a body member 10 having an end wall portion 11. The end wall carries a pair of rollers 12 and 13 for supporting a tube which is to be cut, these rollers having notches as shown for receiving a flange which is sometimes found on the end of a tube. As suggested earlier, the body member need not necessarily comprise a portion of a tube cutting tool.

At the other end of the body member is a shank portion 14 providing a mounting and bearing for a movable cutter holding member 15, which carries a cutting disc 16. The member 15 is movable longitudinally of the shank by means of a handle 17 for cutting a tube which is supported on the rollers 12 and 13.

The body member 10 has a cylindrical end portion 20 which may be welded or otherwise secured thereon or which may be formed integrally with the body member, and a reamer designated generally at 21 is fixedly mounted on the end portion 20. The reamer has a pointed V-shaped blade 22, the sides of which are beveled as indicated at 23 to form leading cutting edges. A sheath member designated generally at 24 has a cylindrical portion 25 and a tube-engaging end 26 with conical walls. A slot 27 contains the reamer and extends from the apex of the conical portion and opens through the conical walls on opposite sides throughout the entire length of the conical portion as seen best in Fig. 1.

The cylindrical portion 25 of the sheath is slidably mounted on the cylindrical end portion 20 of the body member, and the sheath is movable between a normal or first position, as shown in Fig. 1, wherein the reamer 21 is housed within the sheath member, and a second terminal position, as shown in Figs. 3 and 4, wherein the point of the blade 22 projects beyond the apex of the sheath member (see Fig. 4) and wherein the cutting edges project out of the slot throughout the entire length of the conical portion as shown best in Fig. 3.

A compression spring 30 abuts a shoulder 20a on the body portion 20 and a shoulder 25a on the sheath member, and yieldably biases the sheath member to the first terminal position of Fig. 1.

A longitudinally extending elongated slot 31 is provided in the sheath member and a stud 32 is mounted on the portion 20 of the body and extends into the elongated slot for limiting sliding movement of the sheath member. As shown in Fig. 4, the stud 32 may also anchor the reamer 21 on the portion 20.

In the operation of the device, the tension of the spring 31 normally biases the sheath member to the first terminal position of Fig. 1 so that the reamer blade does not project out of the slot 27, thus affording protection both to the blade and to a workman who may handle the tool. When it is desired to ream a burr from the bore of a tube, as the tube 35 shown in Figs. 3 and 4, the conical tube-engaging portion of the reamer is inserted into the bore of the tube and the reamer is rotated, while at the same time force is applied to push the reamer into the tube. This force compresses the spring 30 so that the parts assume the position of Figs. 3 and 4 with the point of the reamer and the cutting edges projecting out of the slot 27. Inasmuch as the sides of the blade are beveled, the blade will have leading cutting edges and the blade should be rotated in a direction (preferably clockwise) to cause these leading edges to ream the burr from the tube. Upon removal of the tool from the tube the spring 30 will automatically restore the parts to the position of Fig. 1.

While I have shown and described certain embodiments of my invention, it is to be understood that it is capable of many modifications. Changes, therefore, in the construction and arrangement may be made without departing from the spirit and scope of the invention as disclosed in the appended claims.

I claim as my invention:

1. A tube working tool comprising a body member having a projecting end portion; a reamer member fixedly mounted on said end portion, said reamer having a pointed V-shaped blade the sides of which form cutting edges; a sheath member having a tube-engaging end with a symmetrical pair of conical shaped walls converging toward an apex and a slot containing said reamer and extending from the apex and opening through said walls on opposite sides throughout the entire length of the conical portion thereof, said sheath member being slidably mounted on said end portion for movement between a first terminal position wherein said reamer is entirely housed within said sheath member and a second terminal position wherein the point of said blade projects beyond the apex of said sheath member and wherein said cutting edges project out of said slot throughout the entire length of said conical portion; means in said projecting end portion for limiting sliding movement of said sheath member and anchoring said reamer member in said end portion; and spring means for yieldably biasing said sheath member to said first terminal position.

2. A tube working tool comprising a body member having a cylindrical end portion containing a slot therein; a reamer member fixedly mounted in the slot of said end portion, said reamer having a pointed V-shaped blade the sides of which are beveled to form leading cutting edges; a sheath member having a cylindrical mounting portion and a tube-engaging end with a symmetrical pair of conical shaped walls converging toward an apex and a slot containing said reamer and extending from the apex and opening through said walls on opposite sides throughout the entire length of the conical portion thereof, the cylindrical portion of said sheath being slidably mounted on said end portion for movement between a first terminal position wherein said reamer is entirely housed within said sheath member and a second terminal position wherein the point of said blade projects beyond the apex of said sheath member and wherein said cutting edges project out of said slot throughout the entire length of said conical portion, said sheath having an elongated slot in its cylindrical portion; a stud mounted in the end portion of said body member and passing through said reamer, anchoring it to said body member, said stud extending into said elongated slot for limiting sliding movement of said sheath member at said terminal positions; and a spring for yieldably biasing said sheath member in said first terminal position.

ROBERT D. McINTOSH.

References Cited in the file of this patent

UNITED STATES PATENTS

| Number | Name | Date |
|---|---|---|
| 621,305 | Kaiser | Mar. 14, 1899 |
| 2,187,221 | Brown | Jan. 16, 1940 |
| 2,418,790 | Pechham, Jr. | Apr. 8, 1947 |
| 2,430,997 | Schmidt, Jr. | Nov. 18, 1947 |